(12) United States Patent
Mangeiga et al.

(10) Patent No.: US 6,330,995 B1
(45) Date of Patent: Dec. 18, 2001

(54) AIRCRAFT ENGINE MOUNT

(75) Inventors: John A. Mangeiga, North Andover; Christopher J. Wilusz, Peabody, both of MA (US); Cornelius H. Dykhuizen, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/515,171

(22) Filed: Feb. 29, 2000

(51) Int. Cl.[7] .................................................. F16M 13/00
(52) U.S. Cl. ............................ 248/554; 248/557; 244/54; 60/39.31
(58) Field of Search ..................................... 248/544, 555, 248/556, 557; 244/54, 53 R, 55; 60/39.31

(56) References Cited

U.S. PATENT DOCUMENTS

| | | | |
|---|---|---|---|
| 4,603,822 | * | 8/1986 | Chee ........................................ 244/54 |
| 4,943,013 | * | 7/1990 | Kapala et al. .......................... 244/54 |
| 5,275,357 | | 1/1994 | Seelen et al. .......................... 244/54 |
| 5,277,382 | | 1/1994 | Seelen et al. .......................... 244/54 |
| 5,303,880 | | 4/1994 | Cencula et al. ........................ 244/54 |
| 5,320,307 | * | 6/1994 | Spofford et al. ....................... 244/54 |
| 5,351,930 | * | 10/1994 | Gwinn et al. ......................... 248/557 |
| 5,443,229 | * | 8/1995 | O'Brien et al. ........................ 244/54 |
| 5,620,154 | * | 4/1997 | Hey ......................................... 244/54 |
| 5,649,417 | * | 7/1997 | Hey ...................................... 60/39.31 |
| 5,725,181 | * | 3/1998 | Hey ......................................... 244/54 |
| 5,860,623 | * | 1/1999 | Dunstan et al. ........................ 244/54 |
| 5,921,500 | * | 7/1999 | Ellis et al. .............................. 244/54 |
| 5,927,644 | | 7/1999 | Ellis et al. .............................. 244/54 |

* cited by examiner

Primary Examiner—Anita King
(74) Attorney, Agent, or Firm—Andrew C. Hess; Nathan D. Herkamp

(57) ABSTRACT

An aircraft engine mount for mounting an engine to an aircraft includes a mounting frame fixedly joined to the aircraft, first and second prime links and a waiting failsafe link. The first prime link is joined to the engine at a first joint and to the mounting frame at second and third joints. The second prime link is joined to the engine at a fourth joint and to the mounting frame at fifth and sixth joints. The waiting failsafe link is joined to the engine at a seventh joint and to the mounting frame at an eighth joint. The first, third, fourth, sixth and seventh joints are ball joints, and the second and eighth joints are translating ball joints. The fifth joint is a clearance pin joint. All of the translating ball joints include a spherical bearing disposed in an opening in the respective link and a pin extending through the spherical bearing. An inner bushing is disposed on the pin and an outer bushing disposed over the inner bushing. The inner bushing has an oppositely disposed set of planar surfaces formed on its outside diameter, and the outer bushing has an oppositely disposed set of axially extending planar surfaces formed on its inside diameter. Each one of the set of planar surfaces formed on the outer bushing slidingly engages a corresponding one of the set of planar surfaces formed on the inner bushing.

15 Claims, 6 Drawing Sheets

AIRCRAFT ENGINE MOUNT

BACKGROUND OF THE INVENTION

This invention relates generally to aircraft engines and more particularly to mounts for supporting an engine on an aircraft.

An aircraft engine may be mounted to an aircraft at various locations such as the wings, fuselage or tail. The engine is typically mounted at both its forward and aft ends by corresponding forward and aft mounts for carrying various loads to the aircraft. The loads typically include vertical loads such as the weight of the engine itself, axial loads due to the thrust generated by the engine, lateral loads such as those due to wind buffeting, and roll loads or moments due to rotary operation of the engine. The mounts must also accommodate both axial and radial thermal expansion and contraction of the engine relative to the supporting pylon.

One exemplary mount includes a pair of circumferentially spaced apart prime links mount includes a pair of circumferentially spaced apart prime links. Each prime link is joined at one end to the aircraft and at the other end to a casing in the engine. At least one of the prime links is fixedly joined to the aircraft by two pins such that the link will not rotate in a plane extending perpendicularly through the centerline axis of the engine. This fixed prime link is provided so that the mount can accommodate in-plane loads, i.e. those in a single vertical axial plane extending perpendicularly to the engine centerline axis, including the vertical loads, lateral or horizontal loads, and roll loads or moments. By rigidly joining the fixed prime link to the aircraft at two points and to the engine casing at a single point, the fixed prime link can transfer in-plane loads from the engine to the aircraft through tension, compression, and bending thereof.

The other prime link can be pivotally joined between the aircraft and engine casing so as to only transfer tensile and compressive loads along its longitudinal axis. This so-called swing link is otherwise free to rotate in-plane relative to the aircraft and engine casing. Allowing the swing link to rotate accommodates radial expansion and contraction of the engine without introducing additional reaction stresses that would otherwise occur.

This exemplary mount further includes a waiting failsafe link disposed between the two prime links. The failsafe link is normally not a load bearing member, but is provided solely for carrying loads upon failure of either one of the prime links. The failsafe link is joined at one end to the aircraft and at the other end to the engine casing, typically via clearance pin joints in which pins extend through holes formed in the ends of the failsafe link and a corresponding clevis formed on the supporting structure. One of these joints is provided with a predetermined clearance between the pin and the hole so that during normal operation of the mount, no loads are transferred from the engine to the aircraft through the failsafe link. However, upon failure of either prime link, the pin will contact the failsafe link at its hole for transferring loads through the failsafe link that would otherwise be transmitted through the failed prime link.

Although generally operating in a satisfactory manner, this exemplary mount suffers from a potential drawback in that the clearance required in the connection joints of the failsafe link typically results in loose pieces that vibrate and cause wear or other damage. Furthermore, the joints that connect the prime links to the aircraft typically require costly precision machining to avoid assembly stack-up issues that would impede installation of the engine. Conventional prime link joints can also result in undesirable thermal stresses.

Accordingly, there is a need for an aircraft engine mount that avoids the wear and thermal stress problems of conventional mounts while being relatively easy to assemble.

BRIEF SUMMARY OF THE INVENTION

The above-mentioned need is met by the present invention which provides an aircraft engine mount that includes a mounting frame fixedly joined to an aircraft and first and second prime links and a waiting failsafe link. The first prime link is joined to the engine at a first joint and to the mounting frame at second and third joints. The first and third joints are ball joints, and the second joint is a translating ball joint. The second prime link is joined to the engine at a fourth joint and to the mounting frame at fifth and sixth joints. The fourth and sixth joints are ball joints, and the fifth joint is a clearance pin joint. The waiting failsafe link is joined to the engine at a seventh joint and to the mounting frame at an eighth joint. The seventh joint is a ball joint, and the eighth joint is a translating ball joint.

All of the translating ball joints include a spherical bearing disposed in an opening in the respective link and a pin extending through the spherical bearing. An inner bushing is disposed on the pin, adjacent to the spherical bearing, and an outer bushing disposed over the inner bushing. The inner bushing has an oppositely disposed set of planar surfaces formed on its outside diameter, and the outer bushing has an oppositely disposed set of axially extending planar surfaces formed on its inside diameter. Each one of the set of planar surfaces formed on the outer bushing slidingly engages a corresponding one of the set of planar surfaces formed on the inner bushing.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with accompanying drawing figures in which:

DETAILED DESCRIPTION OF THE INVENTION

Figure 1:
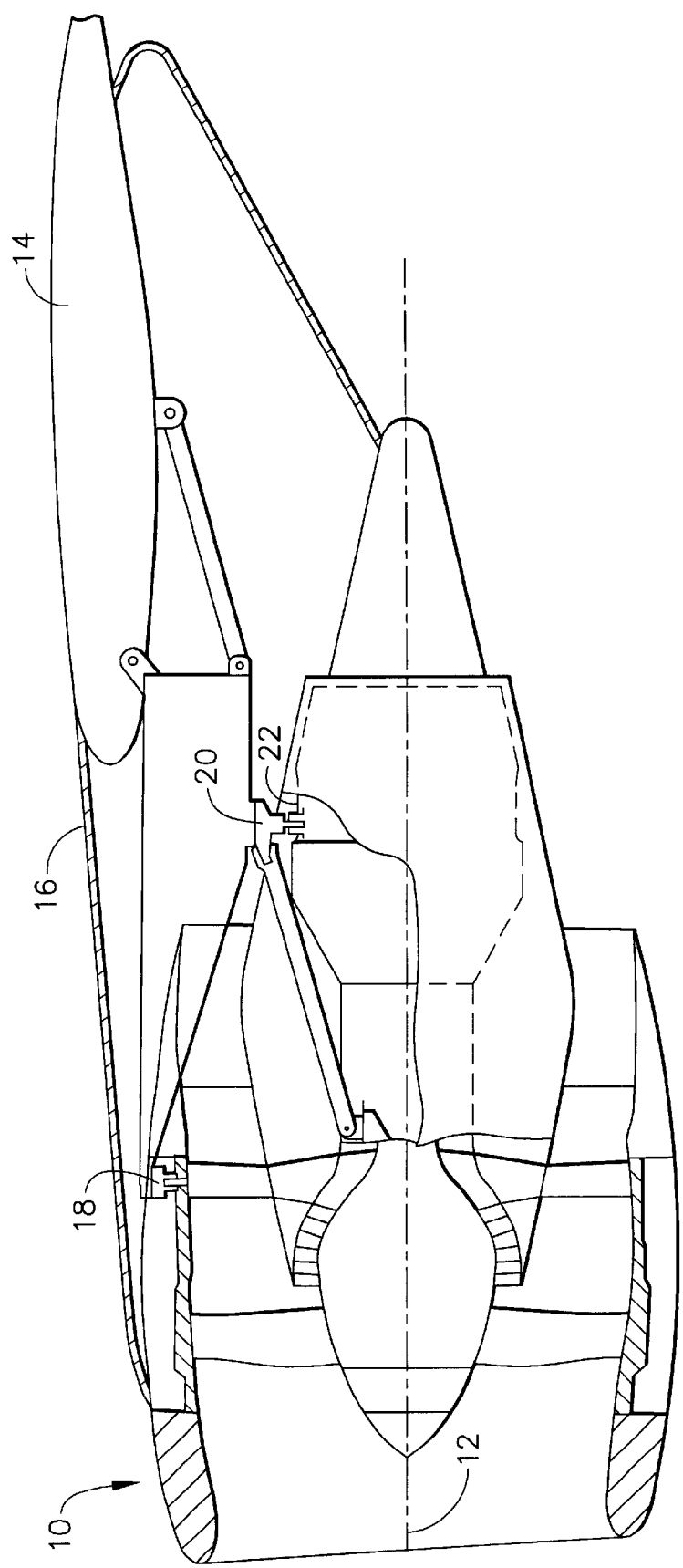
FIG. 1 is a side view of a gas turbine engine mounted to a pylon below an aircraft wing by the forward and aft engine mounts of the present invention.

Referring to the drawings wherein identical reference numerals denote the same elements throughout the various views, FIG. 1 shows an exemplary aircraft engine 10 having a longitudinal or axial centerline axis 12 mounted below an aircraft wing 14. The wing 14 includes a pylon 16, and the engine 10 is mounted to the pylon 16 at a forward mount 18 and an aft mount 20 spaced axially downstream from the forward mount 18. The aft mount 20 is joined to an annular engine casing 22 or some other stationary engine structure. Although only the aft mount 20 is described detail below, it should be noted that the present invention is not limited to aft mounts and is equally applicable to forward mounts. Furthermore, the present invention is not limited to wing-mounted engines, but can also be used with fuselage and tail-mounted engines.

Figure 2:
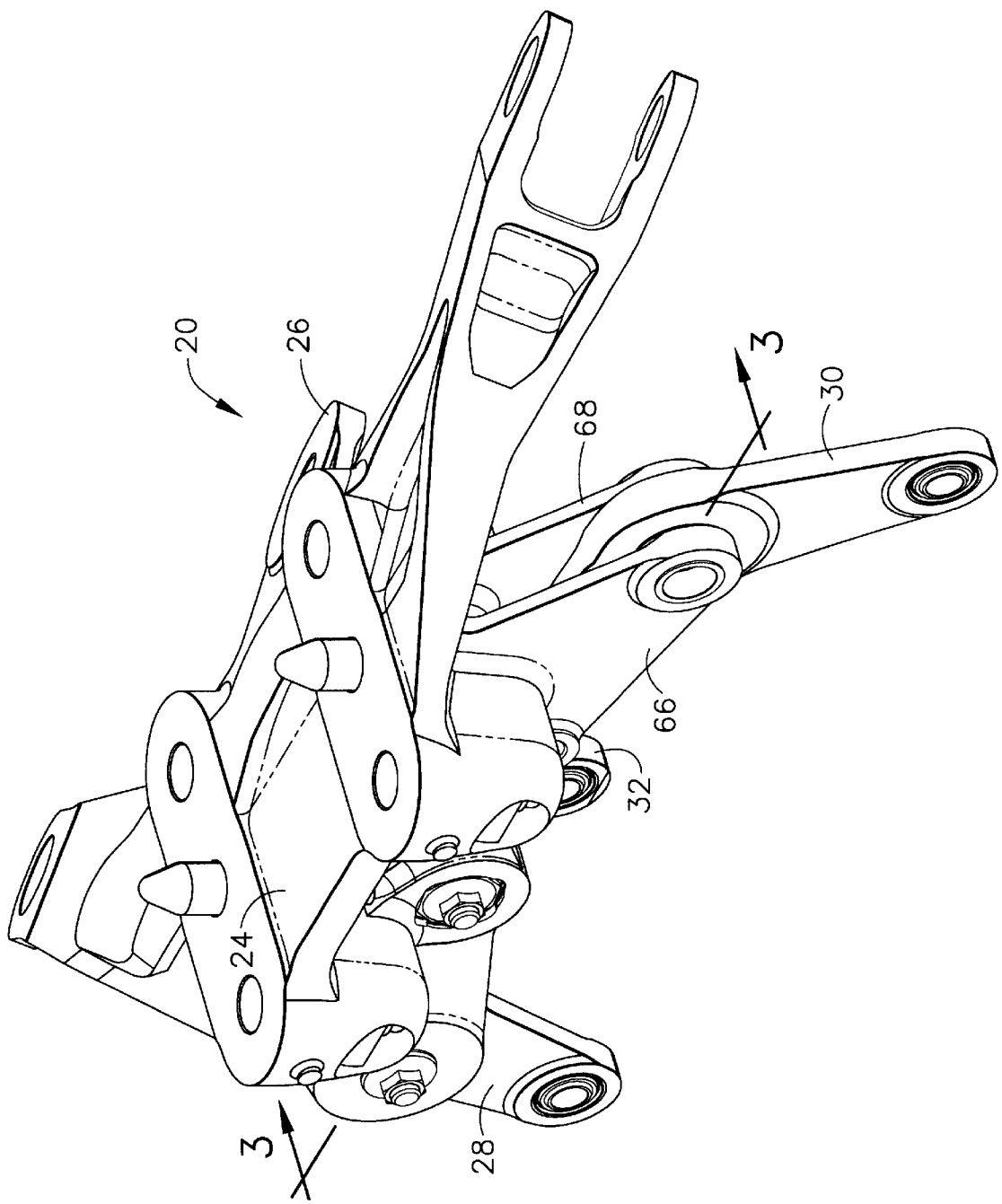
FIG. 2 is a perspective view of the aft engine mount of FIG. 1.
Figure 3:
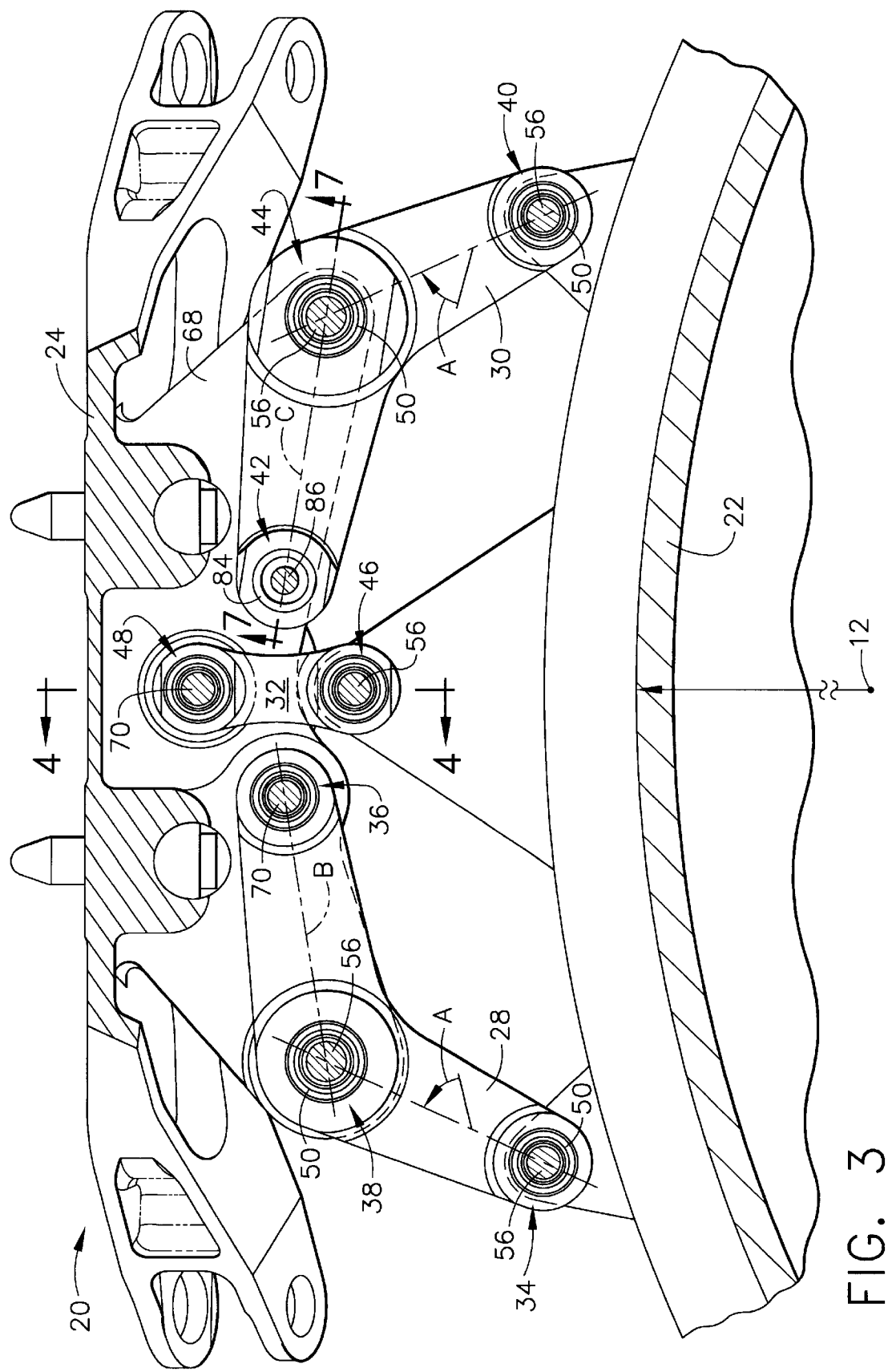
FIG. 3 is a radical cross-sectional view of the aft engine mount.

Referring to FIGS. 2 and 3, it is seen that the aft engine mount 20 includes a mounting frame 24 that is fixedly joined to the pylon 16 (not shown in FIGS. 2 and 3) by conventional means such as bolts. The mounting frame 24 includes conventional axial load bearing structure 26 for reacting thrust generated by the engine 10. The engine mount 20 includes first and second, circumferentially spaced prime links 28 and 30 and a waiting failsafe link 32 located between the two prime links 28 and 30.

The first prime link 28 is joined to the engine casing 22 at a first joint 34 at the inner end thereof, and is joined to the mounting frame 24 at a second joint 36 at the outer end thereof. As used herein with respect to the links 28, 30 and 32, the terms "inner" and "outer" refer to being closer to and farther away from, respectively, the engine 10. The first prime link 28 is additionally joined to the frame 24 at a third joint 38 disposed between the first and second joints 34 and 36. Similarly, the second prime link 30 is joined to the casing 22 at a fourth joint 40 at the inner end thereof, and joined to the frame 24 at a fifth joint 42 at the outer end thereof. The second prime link 30 is additionally joined to the frame 24 at a sixth joint 44 disposed between the fourth and fifth joints 40 and 42.

In the exemplary embodiment illustrated in FIG. 3, the first and second prime links 28 and 30 are bent or angled so as to resemble a boomerang. That is, each prime link has two legs defining an obtuse angle therebetween, a first leg extending between the two mounting frame joints of the respective prime link, and a second leg extending between the innermost mounting frame joint and the corresponding engine joint for that prime link. The second leg of each angled prime link 28 and 30 is inclined from a tangent to the engine casing 22, in the vertical or axial plane, at an angle A of about 40 degrees. The second legs of the prime links 28 and 30 are inclined in opposite directions to one another. In this way, the first and second prime links 28 and 30 straddle the engine casing 22 generally symmetrically with respect to the engine centerline axis 12.

The waiting failsafe link 32 is joined to the engine casing 22 at a seventh joint 46 at the inner end thereof, and is joined to the mounting frame 24 at an eighth joint 48 at the outer end thereof. As will be described in more detail below, the failsafe link 32 is not a load bearing member during normal operation, but provides a backup load path from the engine casing 22 to the frame 24 upon failure of either the first or second prime links 28 and 30. As used herein, failure means the wear, plastic deformation or fracture of the first or second prime links 28 and 30, or of any load bearing joint thereof, which is sufficient to prevent the affected prime link from providing a load path from the casing 22 to the frame 24.

Each of the first, third, fourth, sixth and seventh joints 34, 38, 40, 44 and 46 are preferably conventional ball joints, while the second and eighth joints 36 and 48 are preferably translating ball joints. The fifth joint 42 is a clearance pin joint. The conventional, non-translating ball joints 34, 38, 40, 44 and 46 provide 3-axis rotation of the respective link 28, 30 and 32 as is known in the art. The translating ball joints 36 and 48 also have 3-axis rotation capability, and add a unidirectional translation feature described below. Because of their 3-axis rotation capability, the use of multiple ball joints 34, 36, 38, 40, 44, 46 and 48 accommodates axial thermal expansion of the engine 10 between the forward mount 18 and the aft mount 20. That is, as the engine 10 is heated during operation, it expands axially at a greater rate than the pylon 16 such that the engine casing joints 34, 40 and 46 are displaced axially relative to the mounting frame joints 36, 38, 42, 44 and 48. The rotation capability of the ball joints 34, 36, 38, 40, 44, 46 and 48 allows the respective links to rotate or tilt with respect to the vertical axial plane extending perpendicularly to the engine centerline axis 12, thereby accommodating axial thermal expansion of the engine 10.

Figure 4:
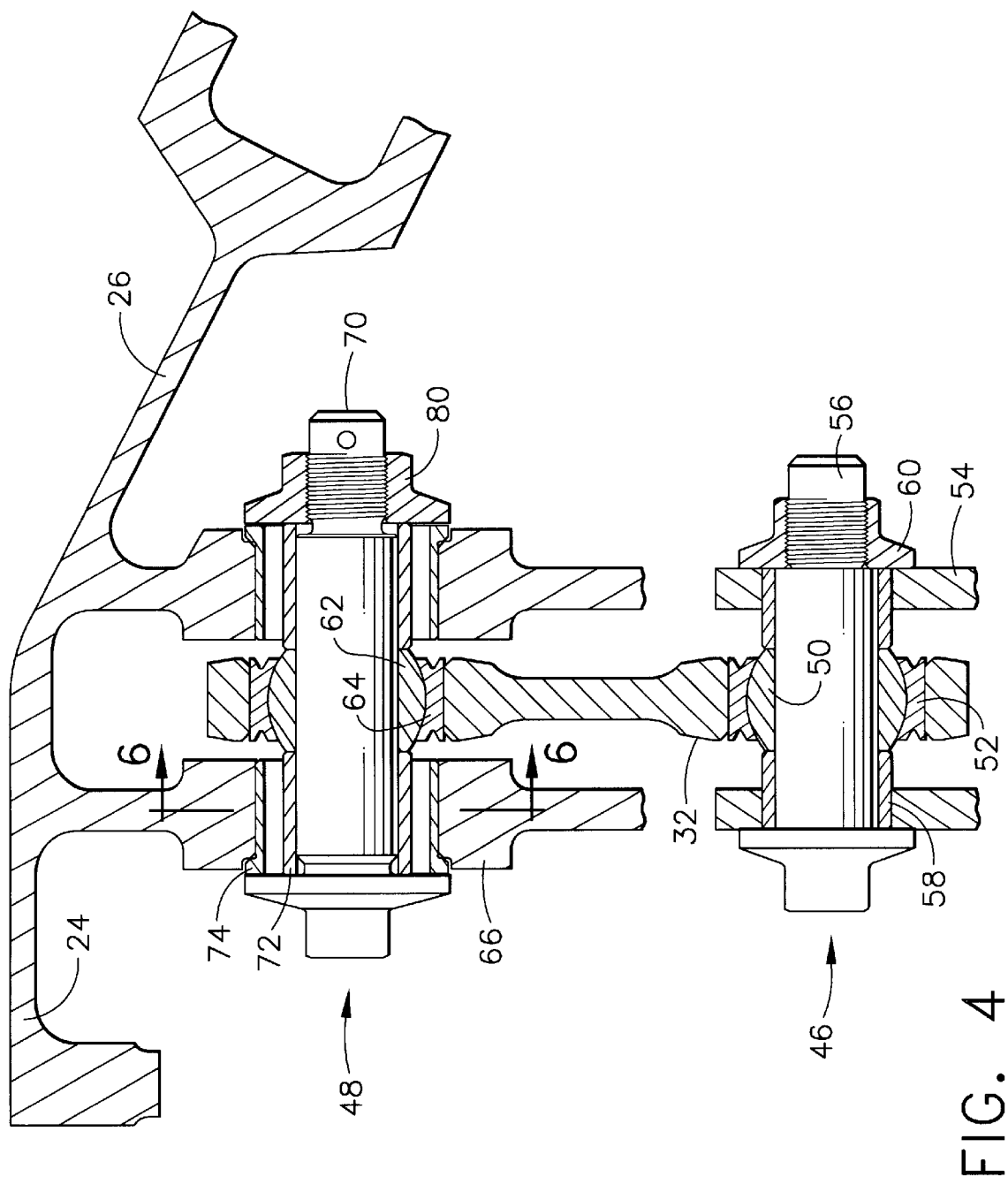
FIG. 4 is an axial cross-sectional view of the waiting failsafe link of the aft mount, taken along line 4—4 of FIG. 3.

Turning to FIG. 4, the seventh and eighth joints 46 and 48 of the waiting failsafe link 32 are shown in more detail. As mentioned above, the seventh joint 46, which joins the inner end of the failsafe link 32 to the casing 22, is a conventional ball joint. As such, it comprises a spherical bearing or uniball 50 disposed in an outer race 52 that is fixed in an opening formed near the inner end of the failsafe link 32. The inner end of the link 32 is located between the two portions of a clevis 54 integrally formed on the engine casing 22. A pin or bolt 56 extends through apertures formed in the clevis 54 and a central aperture in the spherical bearing 50 to pivotally join the inner end of the link 32 to the casing 22. A bushing 58 is provided between the pin 56 and each clevis aperture. The pin 56 is secured by a nut 60.

As seen in FIG. 3, both of the first and fourth joints 34 and 40 are substantially identical to the seventh joint 46 in that they comprise a spherical bearing 50 suitably secured in the inner end of the respective prime links 28 and 30. The inner end of each prime link 28 and 30 is pivotally joined to the engine casing 22 by a pin 56 extending through the respective spherical bearing 50 and a corresponding clevis 54 integrally formed on the casing 22.

Figure 5:
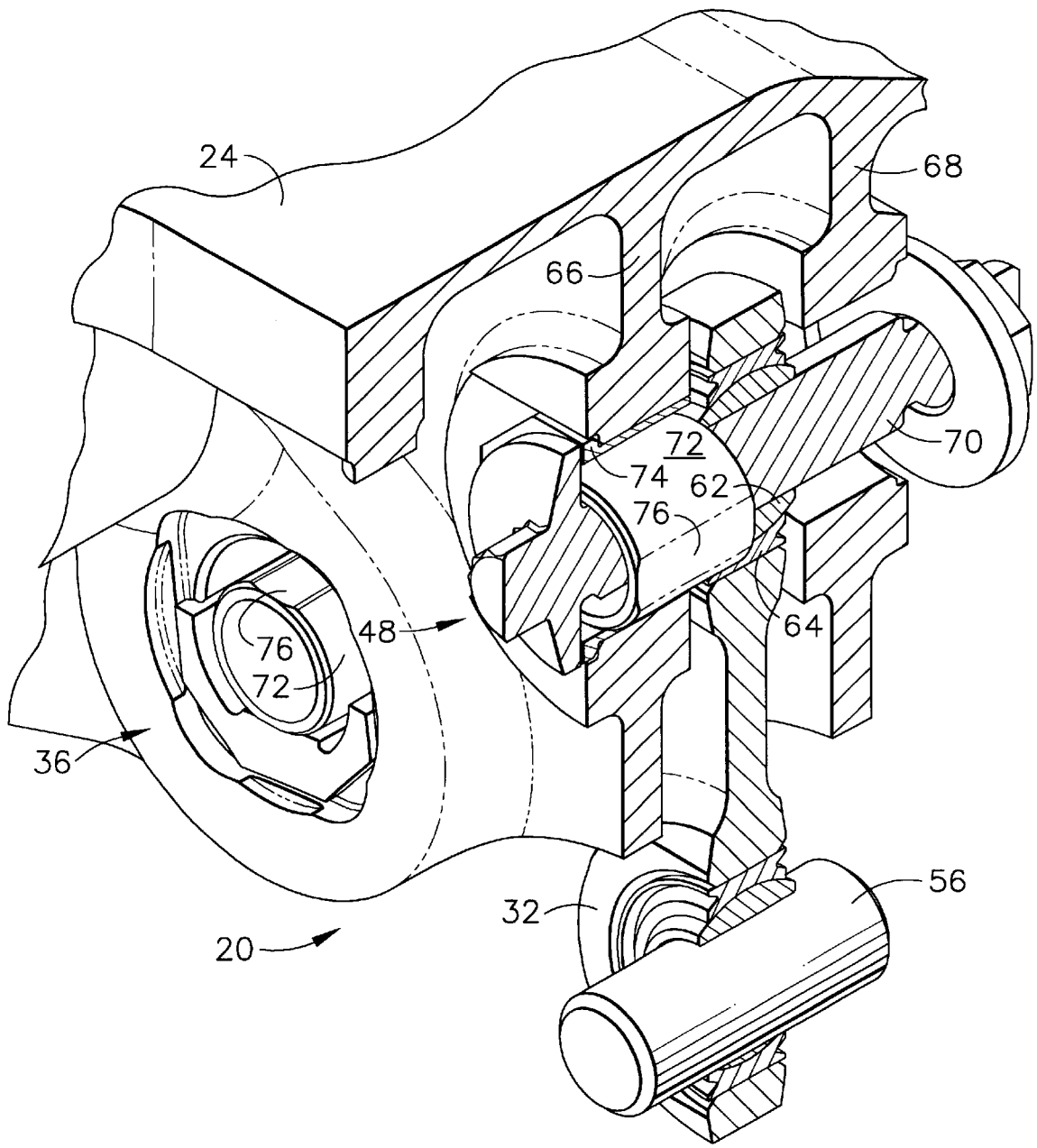
FIG. 5 is an enlarged partially cut away perspective view of the aft engine mount.

Referring now to FIG. 5 as well as FIGS. 3 and 4, the eighth joint 48, which is a translating ball joint that joins the outer end of the failsafe link 32 to the mounting frame 24, is described in more detail. The eighth joint 48 comprises a spherical bearing 62 disposed in an outer race 64 that is fixed in an opening formed near the outer end of the failsafe link 32. The outer end of the link 32 is located between first and second axially spaced flanges 66 and 68 extending downwardly from the underside of the frame 24. The two flanges 66 and 68 are arranged side-by-side to define a clevis. A pin 70 extends through a central aperture in the spherical bearing 62 and a corresponding aperture in each flange 66 and 68 to pivotally join the outer end of the link 32 to the frame 24. This arrangement provides 3-axis rotation of the link 32 relative to the mounting frame 24.

The translating ball joint 48 further includes a pair of inner sliding bushings 72 disposed on the pin 70, one on each side of the spherical bearing 62. Each inner bushing 72 is a substantially annular member defining a longitudinal axis that is generally coincident with the longitudinal axis of the pin 70. A pair of outer fixed bushings 74 is also provided, with one of the outer bushings 74 being disposed over one of the inner bushings 72 and the other outer bushing 74 being disposed over the other inner bushing 72. Each outer bushing 74 is fixedly disposed (preferably by means of a press fit) within a respective one of the apertures of the first and second clevis flanges 66 and 68. The outer bushings 74 are also substantially annular members defining longitudinal axes that are generally parallel to, although not necessarily coincident with, the longitudinal axes of the pin 70 and the inner bushings 72.

Each inner bushing 72 has a set of two flats or planar surfaces 76 formed on the outside diameter thereof. The planar surfaces 76 of each set are located on opposite sides of the respective inner bushing 72 (i.e., are spaced 180 degrees apart) and are parallel to one another. In addition, each outer bushing 74 has a set of two planar surfaces 78 formed on the inside diameter thereof. The planar surfaces 78 of each set are similarly located on opposite sides of the outer bushing 74, 180 degrees apart, and are parallel to one another. All of the planar surfaces 76 and 78 preferably extend the entire length of the respective bushing 72 and 74.

Figure 6:
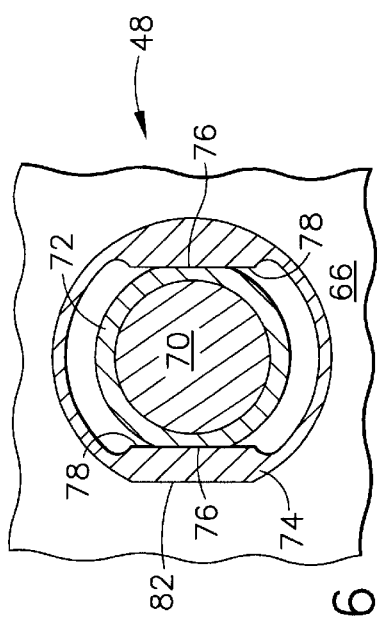
FIG. 6 is radial cross-sectional view of the joint connecting the outer end of the waiting failsafe link to its support structure, taken along line 6—6 of FIG. 4.

Each inner bushing 72 is disposed within its corresponding outer bushing 74 such that the inner planar surfaces 76 are substantially coplanar with the respective outer planar surfaces 78. As best seen in FIG. 6, the inner and outer bushings 72 and 74 are sized such that the inner planar surfaces 76 mate to a close clearance fit with, and thereby slidingly engage, the outer planar surfaces 78.

Except for the engagement of the inner and outer planar surfaces 76 and 78, the outside diameter of the inner bushing 72 is smaller than the inside diameter of the outer bushing 74 so as to form a radial clearance between the bushings 72 and 74. This clearance allows the inner bushings 72 to slide with respect to the outer bushings 74 in a direction parallel to the planar surfaces 76 and 78. Accordingly, the link 32 is able to translate with respect to the frame 24 in a single direction parallel to the planar surfaces 76 and 78 and perpendicular to the longitudinal axis of the pin 70.

A nut 80 is provided on the end of the pin 70 to clamp the spherical bearing 62 and the two inner sliding bushings 72 on the pin 70 and to retain the entire pin assembly on the flanges 66 and 68. A small axial clearance between the nut 80 and the adjacent inner bushing end minimizes pin rotation and permits relative sliding of the bushings 72 and 74. The sliding engagement of the inner and outer planar surfaces 76 and 78 provides wear surfaces that are substantially more durable than conventional aircraft engine mount joints. The nested inner and outer bushings 72 and 74 provide the joint 48 with flat contact areas that reduce bearing contact stresses. And since the bushings 72 and 74 are sized such that the inner and outer planar surfaces 76 and 78 mate to a close clearance fit with one another, the joint 48 permits translation only in the intended direction. This unidirectional translation eliminates much of the overall looseness found in conventional joints, thereby reducing vibration and wear. Furthermore, the wear that does occur is generally confined to the bushings 72 and 74, which are relatively inexpensive to replace and easy to install. The bushings 72 and 74 are preferably made of a wear-resistant material such as Inconel 718.

Each outer bushing 74 is provided on its outside diameter with an anti-rotation means 82 such as a flat surface that engages a cooperating surface in the respective clevis flange aperture of the mounting frame 24. This arrangement prevents rotation of the bushing 74 with respect to the frame 24 and ensures proper alignment of the planar surfaces 78 such that translation occurs in the desired direction. Other anti-rotation means, such as a key-and-slot arrangement, could be used as an alternative to the cooperating flat surfaces.

For the eighth joint 48, the planar surfaces 78 are oriented vertically so that the failsafe link 32 is able to translate vertically (i.e., radially with respect to the centerline axis 12) along its longitudinal axis. This vertical translation permits the failsafe link 32 to function as a non-load bearing member during normal operation, but provide a backup load path from the engine casing 22 to the frame 24 upon failure of either the first or second prime links 28, 30.

Referring again to FIG. 3, the first prime link 28 is joined to the engine casing 22 at the first joint 34, which is substantially identical to the seventh joint 46 described above, and to the mounting frame 24 at the second and third joints 36 and 38. In one preferred embodiment, the second joint 36 is a translating ball joint that is substantially identical in construction to the eighth joint 48 described above, except that the inner and outer planar surfaces 76 and 78 are not oriented vertically. Instead, the second and third joint planar surfaces 76 and 78 are oriented so as to be parallel to the longitudinal axis B defined by the first leg of the first prime link 28. With this orientation, the first prime link 28 is able to grow thermally with respect to the frame 24 in a single direction parallel to the longitudinal axis B. The translating second joint 36 therefore accommodates thermal expansion of the first prime link 28 in its first leg. The longitudinal clearance inherent to the translating second joint 36 also facilitates assembly of the mount 20 without the need for precision machining.

The third joint 38 is a conventional ball joint similar in construction to the seventh joint 46. Namely, the third joint 38 comprises a spherical bearing suitably secured in the first prime link 28. The first prime link 28 would be pivotally joined to the mounting frame 24 by a pin extending through the spherical bearing and the clevis flanges 66 and 68 integrally formed on the frame 24. It should be noted that the second and third joints 36 and 38 could be reversed; that is, the second joint 36 could be the conventional ball joint and the third joint 38 could be the translating ball joint. Thermal expansion would be accommodated as long as one of the second and third joints 36 and 38 provided translation along axis B.

The first prime link 28 is restrained from rotating relative to the frame 24 in the vertical plane extending perpendicularly to the centerline axis 12 by the second and third joints 36 and 38 and is thus considered a fixed link. In this way, the first prime link 28 is effective for transmitting all in-plane loads from the casing 22 to the frame 24 including vertical loads, horizontal loads and roll loads or moments. The first prime link 28 transmits such loads from the casing 22 to the frame 24 either through tension or compression or elastic bending thereof.

Figure 7:
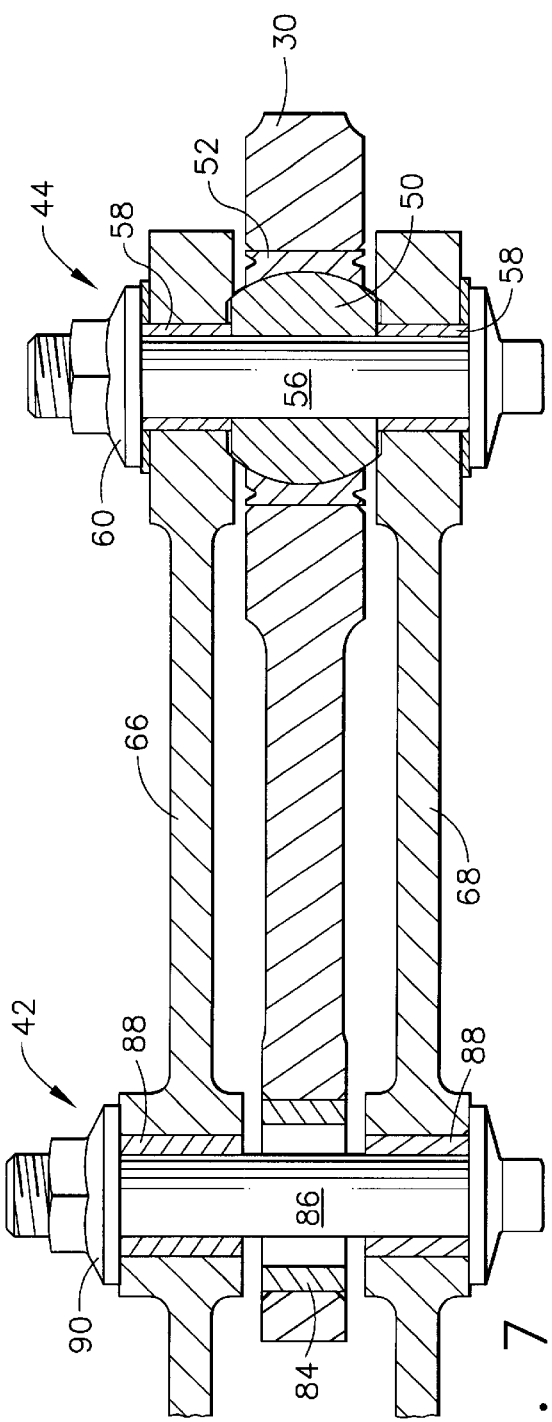
FIG. 7 is a cross-sectional view of a portion of the aft mount's second prime link, taken along time 7—7 of FIG. 3.

The second prime link 30 is joined to the casing 22 at the fourth joint 40, which is substantially identical to the seventh joint 46, and to the frame 24 at the fifth and sixth joints 42 and 44. As best seen in FIG. 7, The sixth joint 44 is a conventional ball joint that is substantially identical in construction to the seventh joint 46. In this case, the sixth joint 44 comprises a spherical bearing 50 suitably secured in the second prime link 30 via an outer race 52. The second prime link 30 would be pivotally joined to the mounting frame 24 by a pin 56 extending through the spherical bearing 50 and the clevis flanges 66 and 68 integrally formed on the frame 24. A bushing 58 is provided between the pin 56 and each clevis aperture. The pin 56 is secured by a nut 60.

The fifth joint 42 is a clearance pin joint comprising a bushing 84 fixed in an opening formed in the second prime link 30. A pin 86 extends through an aperture formed in each clevis flange 66 and 68 and the bushing 84 to join the second prime link 30 to the frame 24. A bushing 88 is provided between the pin 56 and each clevis flange aperture. The pin 86 is secured by a nut 90. The inside diameter of the bushing 84 is larger than the outside diameter of the pin 86 so as to provide a radial clearance therebetween. This clearance allows limited rotation of the second prime link 30 relative to the fame 24 in the vertical plane extending perpendicularly to the centerline axis 12 during normal operation. The second prime link 30 is thus considered a swing link. The second prime link 30 does not have the ability during normal operation of the mount 20 to transmit side loads or any other loads other than those in either tension or compression. This is necessary for allowing unrestrained radial thermal expansion and contraction of the engine casing 22 without imposing additional reaction forces from the second prime link 30.

It should be noted that the present invention includes the fifth and sixth joints 42 and 44 being reversed. That is, the fifth joint 42 could be the translating ball joint providing translation along axis C, and the sixth joint 44 could be the clearance pin joint providing limited rotation of the second prime link 30 relative to the frame 24. The second prime link 30 would still function as described above. Furthermore, although the first prime link 28 has been described as the fixed link, and the second prime link 30 has been described as the swing link, it should be noted that these roles could easily be reversed.

During normal operation of the mount 20, the failsafe link 32 is a non-load bearing member due to the clearance in the eighth joint 48, and the first and second prime links 28 and 30 carry all of the loads between the casing 22 and the frame 24. In the event of failure of the second prime link 30, the eighth joint 48 becomes fully translated so that the radial clearance between the inner and outer bushings 72 and 74 thereof is closed. That is, the inner bushings 72 slide into contact with the respective outer bushings 74 at the radially outermost (with respect to the centerline axis 12) point thereof. In this position, the eighth joint 48 behaves like a conventional ball joint having 3-axis rotation capability. Loads in the translation direction are reacted in either tension or compression along the longitudinal axis of the failsafe link 32, and relative motions in the axial direction are accommodated by the rotation capability. The first prime link 28 remains effective for transmitting all in-plane loads whether by tension, compression, or bending thereof. The mount 20 thus remains effective for carrying all required in-plane loads.

In the event of failure of the first prime link 28, the failsafe link 32 will become a load bearing member in the same manner described above. However, since the failsafe link 32 is not effective for carrying in-plane loads other than those in tension or compression, the second prime link 30 must function as a fixed link for the mount 20 to remain effective. Thus, upon failure of the first prime link 28, the pin 86 of the fifth joint 42 will move into contact wit the bushing 84, thereby closing the radial clearance therebetween. The second prime link 30 is thus restrained from rotating relative to the frame 24 in the vertical plane extending perpendicularly to the centerline axis 12 by the fifth and sixth joints 42 and 44. The second prime link 30 then becomes effective for transmitting all in-plane loads whether by tension, compression or bending thereof.

The foregoing has described an improved aircraft engine mount that uses translating ball joints. While specific embodiments of the present invention have been described, it will be apparent to those skilled in the art that various modifications thereto can be made without departing from the spirit and scope of the invention as defined in the appended claims.

What is claimed is:

1. In a mount for supporting an engine on an aircraft and comprising at least one link joined between said engine and said aircraft, a translating ball joint comprising:
   a spherical bearing disposed in an opening in said link;
   a pin extending through said spherical bearing;
   an first inner bushing disposed on said pin, adjacent to said spherical bearing, said first inner bushing having an outside diameter and an oppositely disposed set of planar surfaces formed on said outside diameter; and
   an outer bushing disposed over said inner bushing, said first outer bushing having an inside diameter and an oppositely disposed set of axially extending planar surfaces formed on said inside diameter, each one of said set of planar surfaces formed on said outer bushing slidingly engaging a corresponding one of said set of planar surfaces formed on said first inner bushing.

2. The translating ball joint of claim 1 wherein said pin has a longitudinal axis and said inner bushing and said outer bushing are sized to allow translation of said link relative to one of said engine or said aircraft in a direction parallel to both sets of planar surfaces and perpendicular to said longitudinal axis.

3. The translating ball joint of claim 1 wherein said inner bushing and said outer bushing are sized to define a radial clearance therebetween.

4. The translating ball joint of claim 1 wherein said outer bushing is fixedly disposed in one of said engine or said aircraft.

5. The translating ball joint of claim 1 wherein said inner bushing defines a longitudinal axis and said outer bushing defines a longitudinal axis that is parallel to said longitudinal axis of said inner bushing.

6. The translating ball joint of claim 1 further comprising means for preventing rotation of said outer bushing and aligning said planar surfaces of said outer bushing.

7. The translating ball joint of claim 1 further comprising:
   a second inner bushing disposed on said pin, adjacent to said spherical bearing and on the opposite side thereof from said first inner bushing, said second inner bushing having an outside diameter and an oppositely disposed set of planar surfaces formed on said outside diameter; and
   a second outer bushing disposed over said second inner bushing, said second outer bushing having an inside diameter and an oppositely disposed set of axially extending planar surfaces formed on said inside diameter, each one of said set of planar surfaces formed on said second outer bushing slidingly engaging a corresponding one of said set of planar surfaces formed on said second inner bushing.

8. A mount for supporting an engine on an aircraft, said mount comprising:
   a mounting frame adapted fixedly to joined to said aircraft;
   a first prime link join to said engine at a first joint and to said mounting frame at second and third joints, wherein said first and third joints are ball joints and said second joint is a translating ball joint;
   a second prime link adapted to join to said engine at a fourth joint and to said mounting frame at fifth and sixth joints, wherein said fourth and sixth joints are ball joints and said fifth joint is a clearance pin joint; and
   a waiting failsafe link adapted to join to said engine at a seventh joint and to said mounting frame at an eighth joint, wherein said seventh joint is a ball joint and said eighth joint is a translating ball joint.

9. The mount of claim 8 wherein said waiting failsafe link is located between said first and second prime links.

10. The mount of claim 8 wherein said second and third joints prevent rotation of said first prime link relative to said frame and said fifth and sixth joints allow limited rotation of said second prime link relative to said frame.

11. The mount of claim 8 wherein said first prime link has first and second legs formed at an angle, said first leg extending between said second and third joints and said second leg extending between said first and third joints.

12. The mount of claim 8 wherein said second prime link has first and second legs formed at an angle, said first leg extending between said fifth and sixth joints and said second leg extending between said fourth and sixth joints.

13. The mount of claim 8 wherein said second joint comprises:
   a spherical bearing disposed in an opening in said first prime link;
   a pin extending through said spherical bearing and said mounting frame;
   an inner bushing disposed on said pin, adjacent to said spherical bearing, said inner bushing having an outside diameter and an oppositely disposed set of planar surfaces formed on said outside diameter; and
   an outer bushing disposed over said inner bushing, said outer bushing having an inside diameter and an oppositely disposed set of axially extending planar surfaces formed on said inside diameter, each one of said set of planar surfaces formed on said outer bushing slidingly engaging a corresponding one of said set of planar surfaces formed on said inner bushing.

14. The mount of claim 8 wherein said eighth joint comprises:
   a spherical bearing disposed in an opening in said waiting failsafe link;
   a pin extending through said spherical bearing and said mounting frame;
   an inner bushing disposed on said pin, adjacent to said spherical bearing, said inner bushing having an outside diameter and an oppositely disposed set of planar surfaces formed on said outside diameter; and
   an outer bushing disposed over said inner bushing, said outer bushing having an inside diameter and an oppositely disposed set of axially extending planar surfaces formed on said inside diameter, each one of said set of planar surfaces formed on said outer bushing slidingly engaging a corresponding one of said set of planar surfaces formed on said inner bushing.

15. The mount of claim 8 wherein said fifth joint comprises:
   a bushing disposed in an opening in said second prime link; and
   a pin extending through said bushing and said mounting frame, wherein a radial clearance exists between said pin and said bushing.

* * * * *